(12) United States Patent
Song et al.

(10) Patent No.: US 12,525,299 B2
(45) Date of Patent: Jan. 13, 2026

(54) MEMORY PERFORMING RESET OPERATION AND OPERATING METHOD THEREOF

(71) Applicant: SK hynix Inc., Icheon-si (KR)

(72) Inventors: Byung Woo Song, Icheon-si (KR); Ki Cheol Son, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 167 days.

(21) Appl. No.: 18/339,069

(22) Filed: Jun. 21, 2023

(65) Prior Publication Data

US 2024/0347112 A1 Oct. 17, 2024

(30) Foreign Application Priority Data

Apr. 17, 2023 (KR) .................. 10-2023-0049771

(51) Int. Cl.
*G11C 16/22* (2006.01)
*G11C 16/04* (2006.01)

(52) U.S. Cl.
CPC .......... *G11C 16/22* (2013.01); *G11C 16/0483* (2013.01)

(58) Field of Classification Search
CPC ..... G11C 16/22; G11C 16/0483; G11C 7/222; G11C 16/08; G11C 16/20; G11C 16/32; G11C 16/24
USPC ...................................... 365/185.04
See application file for complete search history.

(56) References Cited

U.S. PATENT DOCUMENTS

| | | | |
|---|---|---|---|
| 2010/0174923 A1* | 7/2010 | Houlihan | G06F 1/329 716/133 |
| 2011/0010584 A1 | 1/2011 | Kochar et al. | |
| 2017/0116039 A1 | 4/2017 | Mealey et al. | |

FOREIGN PATENT DOCUMENTS

| | | | | |
|---|---|---|---|---|
| CN | 113946130 A | * | 1/2022 | ......... G05B 19/0423 |
| CN | 113946148 A | * | 1/2022 | ......... G05B 23/0213 |

* cited by examiner

*Primary Examiner* — Fernando Hidalgo
(74) *Attorney, Agent, or Firm* — WILLIAM PARK AND ASSOCIATES LTD.

(57) ABSTRACT

A memory may include: a cell string including memory cells connected between a bit line and a source line; a watchdog circuit detecting a failing of a reset operation as a fail; and a reset control circuit controlling an operation that protects data of the memory cells in response to the detection of the fail by the watchdog circuit and activating a reset signal.

13 Claims, 5 Drawing Sheets

MEMORY PERFORMING RESET OPERATION AND OPERATING METHOD THEREOF

CROSS-REFERENCE TO RELATED APPLICATION

This application claims priority under 35 U.S.C. § 119 (a) to Korean Patent Application No. 10-2023-0049771 filed on Apr. 17, 2023, in the Korean Intellectual Property Office, which is incorporated herein by reference in its entirety.

BACKGROUND

1. Technical Field

Embodiments of the present disclosure relate to an integrated circuit technology, and more particularly, to a memory.

2. Related Art

Recently, with the miniaturization, low power consumption, high performance, diversification, and the like of electronic devices, there is a demand for memories capable of storing information in various electronic devices, such as computers and portable communication devices. The memories may be roughly classified into volatile memories and nonvolatile memories. The volatile memory has a high data processing speed but has a disadvantage in that power needs to be continuously supplied in order to retain stored data, and the nonvolatile memory does not need to be continuously supplied with power in order to retain stored data but has a disadvantage in that data processing speed is low.

The nonvolatile memory uses a ready/busy signal in order to indicate a ready/busy state of the memory, and a busy stuck phenomenon may occur in which the ready/busy signal does not exit a busy state due to an internal operation error and the like of the memory. When the busy stuck phenomenon occurs, since execution of subsequent operations is not possible, technology that safely exits the ready stuck state is required.

SUMMARY

In an embodiment, a memory may include a cell string including memory cells connected between a bit line and a source line; a watchdog circuit detecting a failing of a reset operation as a fail; and a reset control circuit that controlling an operation that protects data of the memory cells in response to the detection of the fail by the watchdog circuit and activating a reset signal.

In an embodiment, an operation method of a memory may include receiving a reset command; confirming a failing of a reset operation corresponding to the reset command as a fail; performing a protection operation that protects data of memory cells in response to the confirmation; and activating a reset signal after performing the protection operation.

DETAILED DESCRIPTION

Various embodiments are directed to a technology capable of safely performing a reset operation of a memory.

According to embodiments, it is possible to safely perform a reset operation of a memory.

Hereafter, embodiments in accordance with the technical spirit of the present disclosure will be described with reference to the accompanying drawings.

Figure 1:
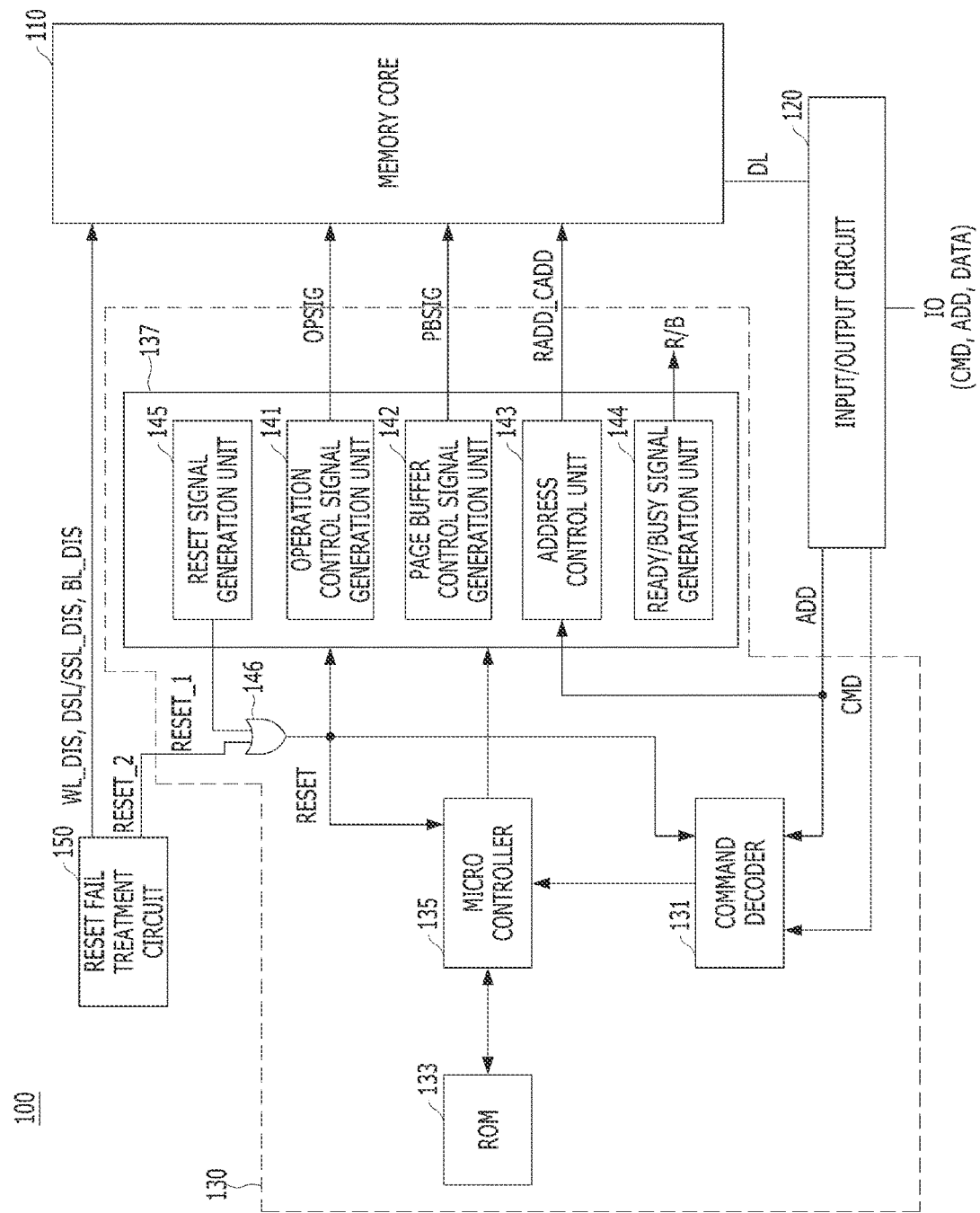
FIG. 1 is a configuration diagram of a memory 100 in accordance with an embodiment.

FIG. 1 is a configuration diagram of a memory 100 in accordance with an embodiment.

Referring to FIG. 1, the memory 100 may include a memory core 110, an input/output circuit 120, a control logic 130, and a reset fail treatment circuit 150.

The memory core 110 may include components related to data storage and data access. An internal configuration of the memory core 110 will be described in detail below together with FIG. 2.

The input/output circuit 120 may communicate with a memory controller through input/output lines IO. For example, the input/output circuit 120 may transmit a command CMD and an address ADD received through the input/output lines IO to the control logic 130 and may transmit received data DATA to the memory core 110 through data lines DL. The input/output circuit 120 may also output the data DATA read from the memory core 110 and transmitted to the data lines DL to the memory controller through the input/output lines IO.

The control logic 130 may generate control signals ROW_CTRL, PBSIG, RADD, and CADD that control read, program, and erase operations of the memory 100 and other control signals RESET and R/B in response to the command CMD and the address ADD. The control logic 130 may include a command decoder 131, a ROM 133, a microcontroller 135, and a control signal generation circuit 137.

The command decoder 131 may decode the command CMD and the address ADD to determine what operation is being instructed by the memory controller.

The microcontroller 135 may execute codes stored in the ROM 133 in response to a decoding result of the command decoder 131, that is, according to an operation to be performed by the memory 100. For example, when the operation to be performed by the memory 100 is a read operation, the microcontroller 135 may execute codes, stored in the ROM 133, related to the read operation.

The control signal generation circuit 137 may generate control signals OPSIG, PBSIG, RADD, CADD, RESET, and R/B according to the result of executing the codes by the microcontroller 135. An operation control signal generation unit 141 may generate operation signals OP_SIG related to the control of a voltage generator, and a page buffer control signal generation unit 142 may generate page buffer control signals PB_CTRL for controlling an operation of a page buffer. An address control unit 143 may generate a row address RADD and a column address CADD by using the address ADD under the control of the microcontroller 135. A ready/busy signal generation unit 144 may generate a ready/busy signal R/B indicating a ready state and a busy state of the memory 100. The ready/busy signal R/B may be output to the memory controller. A reset signal generation unit 145 may generate a first reset signal RESET_1. An OR gate 146 may receive the first reset signal RESET_1 generated by the reset signal generation unit 145 and a second reset signal RESET_2 generated by the reset fail treatment circuit 150 and may output a reset signal RESET. Therefore, when one or more of the first reset signal RESET_1 and the second reset signal RESET_2 are activated, the reset signal RESET may be activated. When the reset signal RESET is activated, the control logic 130 may be initialized. Specifically, the command decoder 131, the microcontroller 135, and the control signal generation circuit 137 of the control logic 130 may be initialized in response to the activation of the reset signal RESET.

The reset fail treatment circuit 150 may detect a reset fail in which a reset operation is not properly performed, perform an operation that protects data stored in memory cells of the memory core 110 when the reset fail is detected, and then activate the reset signal RESET by activating the second reset signal RESET_2. When a busy stuck phenomenon occurs in which the ready/busy signal R/B does not exit a busy state due to various errors in the internal operation of the memory 100, a reset operation for resetting the memory 100 is attempted in order to solve the problem. In the case of the busy stuck phenomenon occurs due to an error in the internal operation of the memory 100, a reset fail may occur in which the reset operation is also not performed correctly. When such a reset fail occurs, the reset fail treatment circuit 150 may perform an operation that protects data of the memory core 110 and may allow the memory 100 to exit the busy stuck state by allowing a reset operation to be performed. The reset fail treatment circuit 150 may generate signals WL_DIS, DSL/SSL_DIS, and BL_DIS that control the memory core 110.

Figure 2:
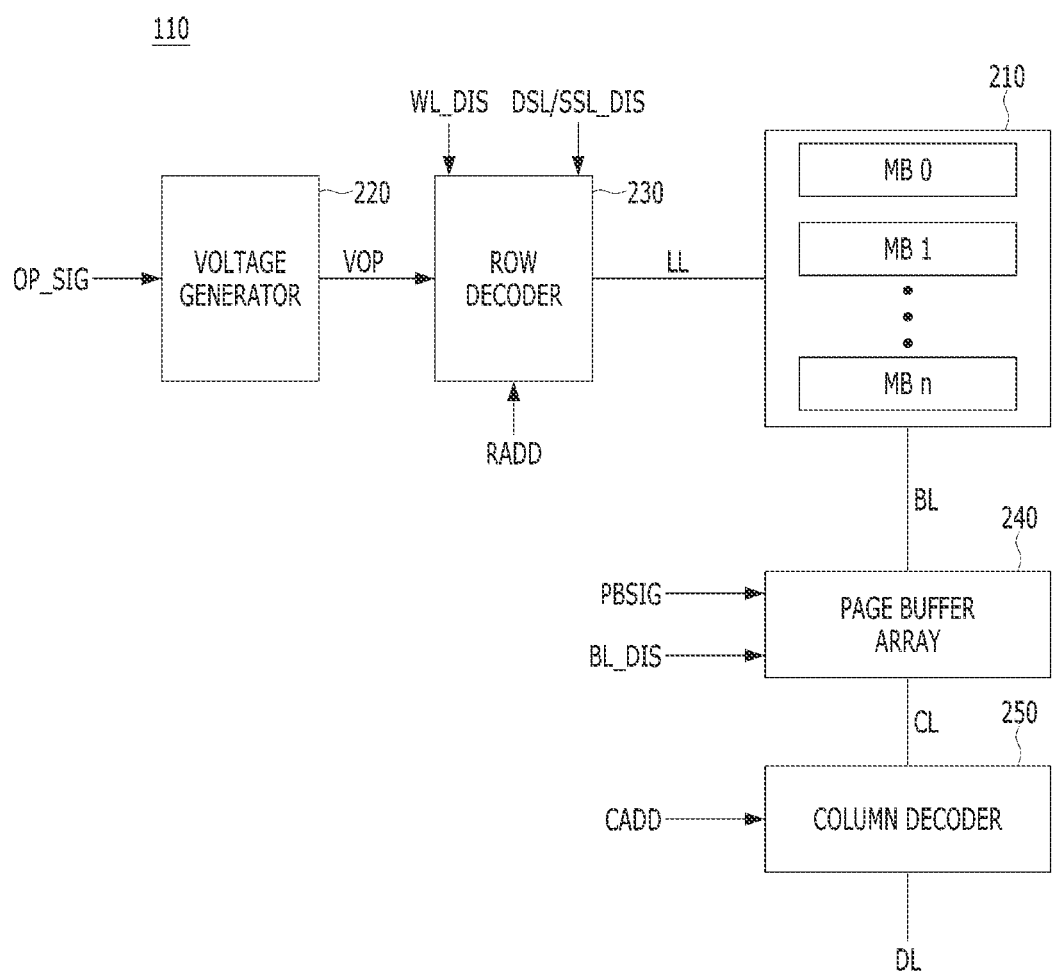
FIG. 2 is a configuration diagram of an embodiment of a memory core 110 of FIG. 1.

FIG. 2 is a configuration diagram of an embodiment of the memory core 110 of FIG. 1.

Referring to FIG. 2, the memory core 110 may include a cell array 210, a voltage generator 220, a row decoder 230, a page buffer array 240, and a column decoder 250.

The cell array 210 may include a plurality of memory blocks MB0 to MBn (n is a positive integer). The memory blocks MB0 to MBn may have a three-dimensional structure. For example, a memory block having a three-dimensional structure may include memory cells stacked vertically from a substrate. The memory blocks MB0 to MBn may have the same structure and may be connected to the row decoder 230 and the page buffer array 240 through bit lines BL and local lines LL.

The voltage generator 220 may generate various operation voltages VOP in response to the operation signals OP_SIG. For example, the voltage generator 220 may generate various voltages used for a program operation, a read operation, a verify operation, and the like. In addition, the voltage generator 220 may generate various voltages used in the memory 100, such as an erase voltage.

The row decoder 130 may transmit the operation voltages VOP to a selected memory block through the local lines LL in response to the row address RADD. The row decoder 130 may also discharge word lines of the memory blocks MB0 to MBn in response to a word line discharge signal WL_DIS and may discharge select lines of the memory blocks MB0 to MBn in response to a select line discharge signal DSL/SSL_DIS.

The page buffer array 240 may be connected to the memory blocks MB0 to MBn through the bit lines BL and may include page buffers respectively connected to the bit lines. The page buffer array 240 may control voltages of the bit lines BL or may sense voltages or currents of the bit lines BL in response to page buffer control signals PB_CTRL. The page buffer array 240 may also discharge the bit lines BL in response to a bit line discharge signal BL_DIS.

The column decoder 250 may exchange data with the page buffer array 240 through column lines CL in response to the column address CADD and may exchange data with the input/output circuit 120 through the data lines DL.

Figure 3:
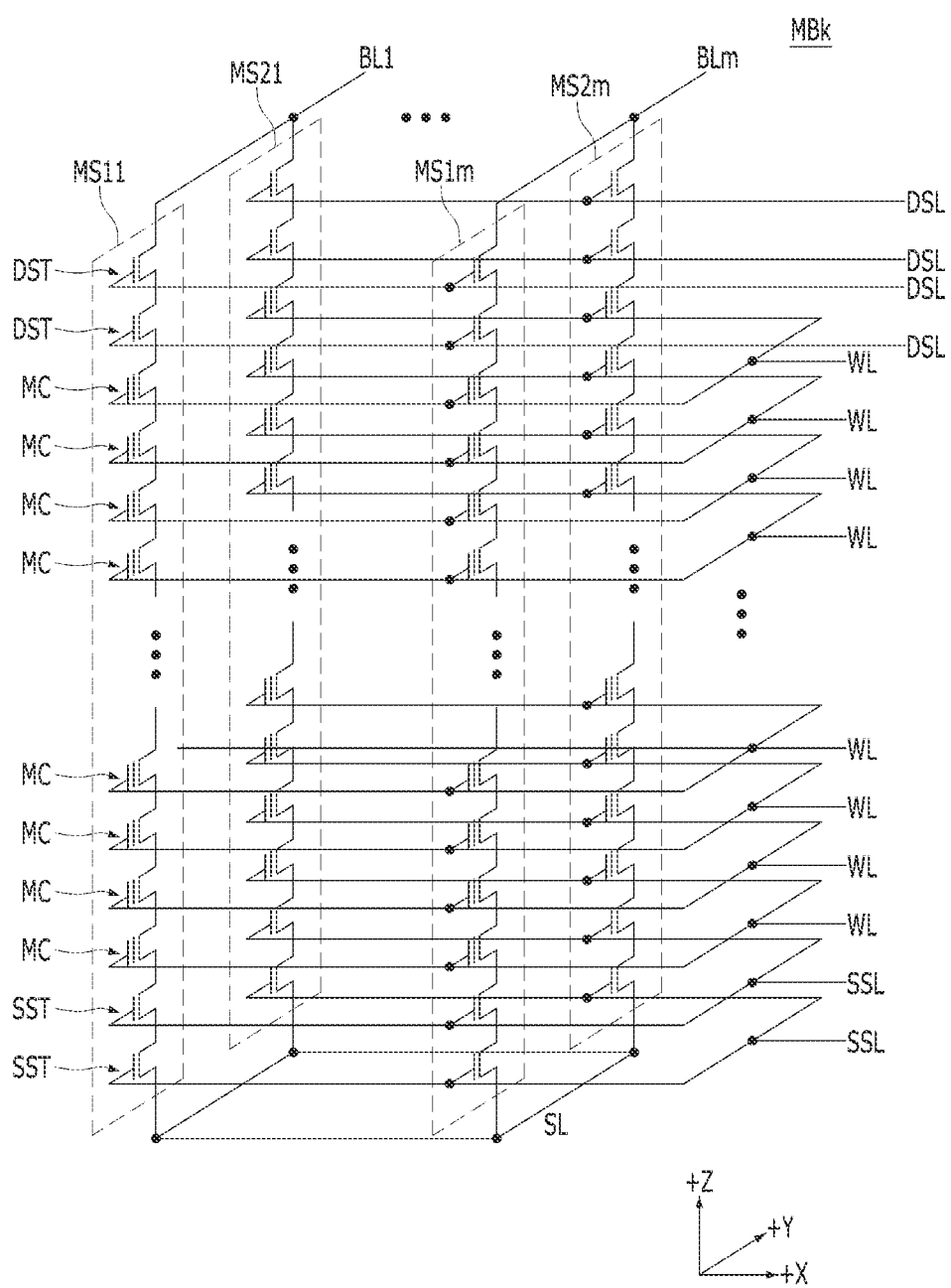
FIG. 3 is a configuration diagram of an embodiment of a memory block MBk (k is an integer of 0 or more and N or less) of FIG. 2.

FIG. 3 is a configuration diagram of an embodiment of the memory block MBk (k is an integer of 0 or more and N or less) of FIG. 2.

Referring to FIG. 3, the memory block MBk may include a plurality of memory strings MS11 to MS1$m$ and MS21 to MS2$m$ connected between bit lines BL1 to BLm and a source line SL. The respective memory strings MS11 to MS1$m$ and MS21 to MS2$m$ may extend along a Z direction. The Z direction may be a direction in which memory cells MC are stacked and may be a direction perpendicular to the substrate. In the above, m is an integer of 2 or more.

Each of the memory strings MS11 to MS1$m$ and MS21 to MS2$m$ may include at least one source select transistor SST, a plurality of memory cells MC, and at least one drain select transistor DST that are connected in series.

The source select transistors SST included in one memory string (any one of MS11 to MS1$m$ and MS21 to MS2$m$) may be connected in series between the memory cells MC and the source line SL. Gate electrodes of the source select transistors SST may be connected to the source select lines SSL. The source select transistors SST located at the same level may be connected to the same source select line SSL.

The memory cells MC included in one memory string (any one of MS11 to MS1$m$ and MS21 to MS2$m$) may be connected in series between at least one source select transistor SST and at least one drain select transistor DST. Gate electrodes of the memory cells MC may be connected to the word lines WL. Operation voltages (program voltage, pass voltage, read voltage, and the like) required for driving may be applied to each of the word lines WL. The memory cells MC located at the same level may be connected to the same word line WL.

Drain select transistors DST included in one memory string (any one of MS11 to MS1$m$ and MS21 to MS2$m$) may be connected in series between the bit lines BL1 to BLm and the memory cells MC. Gate electrodes of the drain select transistors DST may be connected to the drain select line DSL. Among the drain select transistors DST of the memory strings MS11 to MS1$m$ and MS21 to MS2$m$ arranged in the same row (X direction), drain select transistors DST having the same level may be connected to the same drain select line DSL. Drain select transistors DST arranged in different rows (X direction) may be connected to different drain select lines DSL.

Figure 4:
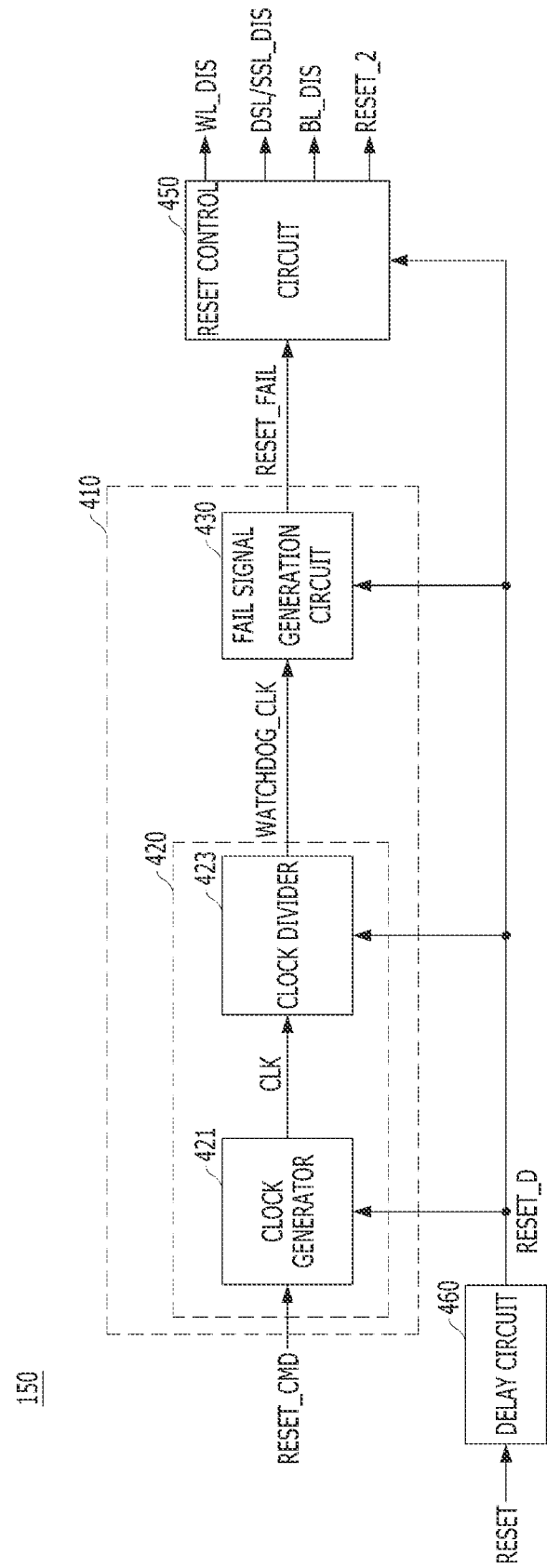
FIG. 4 is a configuration diagram of an embodiment of a reset fail treatment circuit 150 of FIG. 1.

FIG. 4 is a configuration diagram of an embodiment of the reset fail treatment circuit 150 of FIG. 1.

Referring to FIG. 4, the reset fail treatment circuit 150 may include a watchdog circuit 410, a reset control circuit 450, and a delay circuit 460.

The watchdog circuit 410 may detect when a reset operation fails. The watchdog circuit 410 may include a watchdog clock generation circuit 420 and a fail signal generation circuit 430.

The watchdog clock generation circuit 420 may generate a watchdog clock WATCHDOG_CLK in response to a reset command RESET_CMD. The reset command RESET_CMD may be a signal that is activated when a command to perform a reset operation is input to the memory 100. The reset command RESET_CMD may be generated by the command decoder 131 and may be transmitted to the watchdog clock generation circuit 420. The watchdog clock generation circuit 420 may include a clock generator 421 and a clock divider 423.

The clock generator 421 may generate a clock CLK to start toggling in response to the reset command RESET_CMD and to stop the toggling in response to a reset signal RESET_D delayed by the delay circuit 460. The clock divider 423 may generate the watchdog clock WATCHDOG_CLK by dividing the clock CLK. The reason for using the clock divider 423 is to reduce a counting value of the fail signal generation circuit 430 by reducing a frequency (increasing a cycle) of the watchdog clock WATCHDOG_CLK. Since the reset fail treatment circuit 150 operates independently of other components of the memory 100 and monitors a reset fail, the clock CLK and the watchdog clock WATCHDOG_CLK can be used only in the reset fail treatment circuit 150.

The fail signal generation circuit 430 may count the number of activations of the watchdog clock WATCHDOG_CLK and may activate a reset fail signal RESET_FAIL that notifies the failing of the reset operation when the number of activations of the watchdog clock WATCHDOG_CLK reaches a preset value. The fact that the number of activations of the watchdog clock WATCHDOG_CLK has reached a preset value means that the reset signal RESET has not been activated within a predetermined time after the activation of the reset command RESET_CMD. Accordingly, the fail signal generation circuit 430 may determine that the reset operation fails in this case and may activate the reset fail signal RESET_FAIL. When the delayed reset signal RESET_D is activated, the fail signal generation circuit 430 may initialize the counting value of the number of activations of the watchdog clock WATCHDOG_CLK.

The reset control circuit 450 may control an operation that protects data stored in the memory cells of the memory core 110 in response to the activation of the reset fail signal RESET_FAIL and then may allow the reset signal RESET to be activated by activating the second reset signal RESET_2. The reset control circuit 450 may be initialized when the delayed reset signal RESET_D is activated.

The operation that protects the data of the memory cells may be an operation of discharging at least a part of the word lines WL, the select lines DSL and SSL, and the bit lines BL. In order to protect the data stored in the memory cells, it may be preferable to first discharge the word lines WL, then discharge the select lines DSL and SSL, and then discharge the bit lines BL. The reset control circuit 450 may sequentially activate the word line discharge signal WL_DIS, the select line discharge signal DSL/SSL_DIS, and the bit line discharge signal BL_DIS in response to the activation of the reset fail signal RESET_FAIL and then may activate the second reset signal RESET_2. The reset control circuit 450 may be a finite state machine (FSM).

Figure 5:
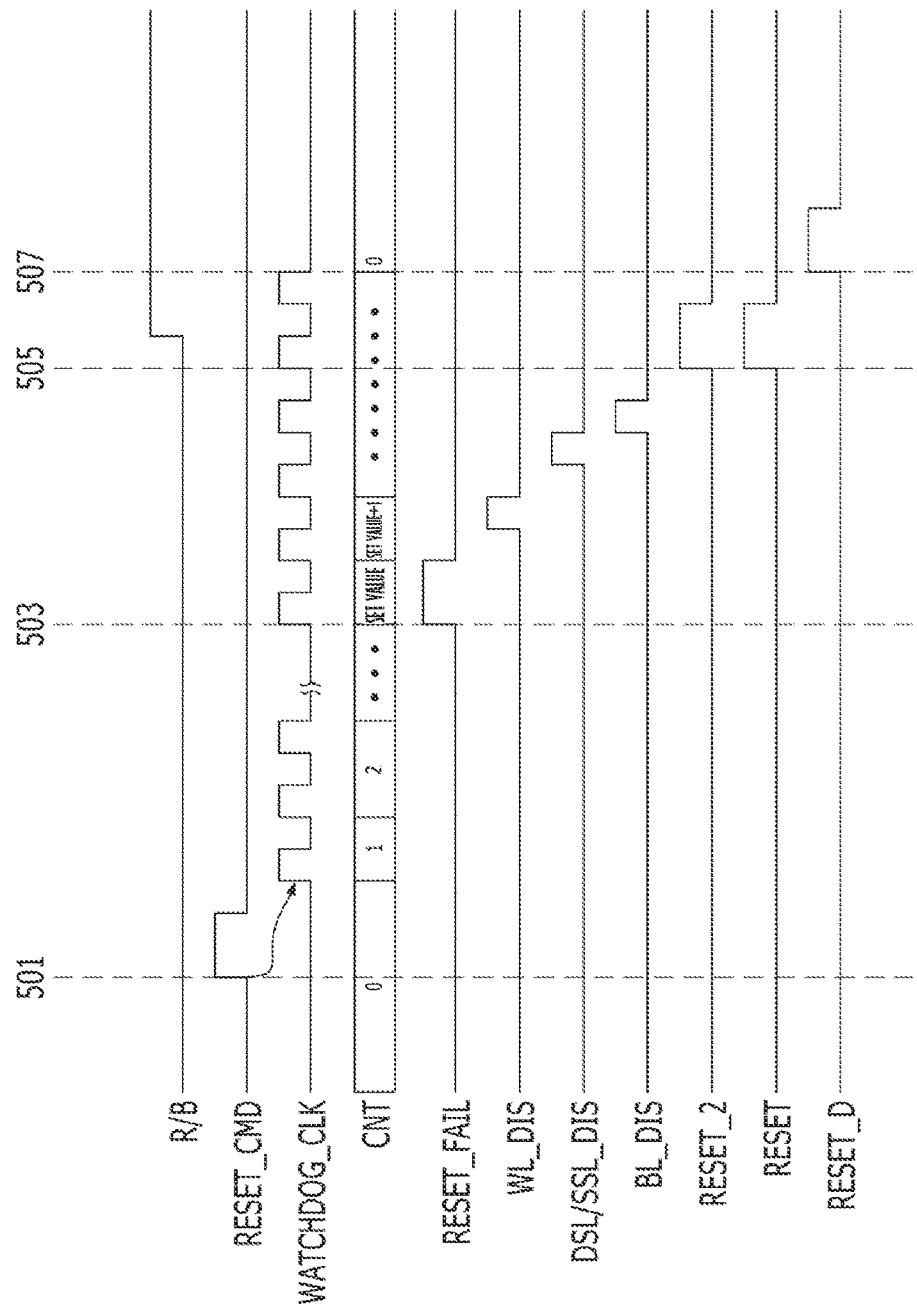
FIG. 5 is a timing diagram illustrating an operation of the reset fail treatment circuit 150 of FIG. 4.

FIG. 5 is a timing diagram illustrating the operation of the reset fail treatment circuit 150 of FIG. 4.

Referring to FIG. 5, a state before a point in time 501 may be a busy stuck state in which the ready/busy signal R/B is continuous in a low state indicating a busy state. A command to perform a reset operation is transmitted from the memory controller to the memory 100 in order to overcome the busy stuck phenomenon, and as a result, the reset command RESET_CMD may be activated at the point in time 501.

In response to the activation of the reset command RESET_CMD, the watchdog clock generation circuit 420 may start toggling the watchdog clock WATCHDOG_CLK.

Subsequently, the fail signal generation circuit 430 may count the number of activations of the watchdog clock WATCHDOG_CLK and may activate the reset fail signal RESET_FAIL at time 503 at which the counting number (indicated by CNT) reaches a set value.

The reset control circuit 450 may sequentially activate the word line discharge signal WL_DIS, the select line discharge signal DSL/SSL_DIS, and the bit line discharge signal BL_DIS in response to the activation of the reset fail signal RESET_FAIL. Accordingly, in the memory core 110, the word lines WL may be discharged, the select lines DSL and SSL may be discharged, and the bit lines BL may be discharged. The lines for controlling the memory cells may be discharged so that data stored in the memory cells of the memory core 110 may be protected.

At a point in time 505 after all the discharge signals are activated, the reset control circuit 450 may activate the second reset signal RESET_2, and as a result, the reset signal RESET may be activated. When the reset signal RESET is activated, the control logic 130 may be initialized, and as a result, the ready/busy signal R/B may also be changed to a ready state (high state) again and exit a busy stuck state.

The delay circuit 460 may generate a delayed reset signal by delaying the reset signal RESET, and at time 507, the delayed reset signal RESET_D may be activated. Subsequently, the reset fail treatment circuit 150 may be initialized by the delayed reset signal RESET_D. The reason why the reset fail treatment circuit 150 is initialized by the delayed reset signal RESET_D, instead of the reset signal RESET, may be to secure a certain margin.

Referring to FIG. 5, when no reset operation is performed for a certain period of time after the reset command RESET_CMD has been activated, the watchdog circuit 410 may determine this as a failing of the reset operation and may confirm that the reset fail signal RESET_FAIL is activated. Subsequently, the reset control circuit 450 may first perform operations that protect data of the memory cells of the memory core 110 in response to the activation of the reset fail signal RESET_FAIL and may activate the reset signal RESET, thereby confirming that a reset operation is performed.

Although embodiments according to the technical idea of the present disclosure have been described above with reference to the accompanying drawings, this is only for explaining the embodiments according to the concept of the present disclosure, and the present disclosure is not limited to the above embodiments. Various types of substitutions, modifications, and changes for the embodiments may be made by those skilled in the art, to which the present disclosure pertains, without departing from the technical idea of the present disclosure defined in the following claims, and it should be construed that these substitutions, modifications, and changes belong to the scope of the present disclosure.

What is claimed is:

1. A memory comprising:
   a cell string including memory cells connected between a bit line and a source line;
   select lines for controlling a connection between the bit line and the cell string and a connection between the source line and the cell string;
   word lines for controlling the memory cells;
   a watchdog circuit detecting a failing of a reset operation as a fail; and
   a reset control circuit for generating discharge control signals in response to the detection of the fail by the watchdog circuit, wherein the discharge control signals cause at least a part of the word lines, the select lines, and the bit line to be discharged, and wherein the reset control circuit is further for activating a reset signal after at least a part of the word lines, the select lines, and the bit line have been discharged.

2. The memory of claim 1, wherein the reset control circuit generates discharge control signals so that the word lines are discharged, then the select lines are discharged, and then the bit line is discharged in response to the detection of the fail.

3. The memory of claim 2, wherein the reset control circuit includes a finite state machine (FSM).

4. The memory of claim 1, wherein the watchdog circuit comprises:
   a watchdog clock generation circuit generating a watchdog clock in response to a reset command; and
   a fail signal generation circuit activating a reset fail signal that notifies the fail of the reset operation when the number of activations of the watchdog clock reaches a preset value.

5. The memory of claim 4, wherein the watchdog clock generation circuit comprises:
   a clock generator generating a clock that starts toggling in response to the reset command and stops the toggling in response to the reset signal; and
   a clock divider generating the watchdog clock by dividing the clock.

6. The memory of claim 1, further comprising:
   a control logic generating control signals that control read, program, and erase operations in response to a command and an address,
   wherein the control logic is initialized in response to an activation of the reset signal.

7. The memory of claim 6, wherein the control logic comprises:
   a command decoder decoding the command and the address;
   a microcontroller executing codes programmed in a ROM in response to a decoding result of the command decoder; and
   a control signal generation circuit generating control signals that control a voltage generator, a row decoder, a page buffer, and a column decoder according to a result of executing the codes by the microcontroller.

8. An operation method of a memory, the operation method comprising:
   receiving a reset command;
   detecting a failing of a reset operation corresponding to the reset command as a fail;
   performing a discharge operation of discharging at least a part of word lines for controlling memory cells, a bit line and select lines for controlling a connection between the bit line and a cell string including the memory cells and a connection between a source line and the cell string, in response to the confirmation; and
   activating a reset signal after performing the discharge operation.

9. The operation method of claim 8, wherein the discharge operation comprises:
   discharging the word lines;
   discharging the select lines after discharging the word lines; and
   discharging the bit line after discharging the select lines.

10. The operation method of claim 8, wherein the confirming of the fail comprises:
    toggling a watchdog clock in response to the reset command;
    counting the number of activations of the watchdog clock; and
    confirming that the number of activations reaches a preset value.

11. The operation method of claim 10, wherein the toggling of the watchdog clock is stopped in response to an activation of the reset signal.

12. The operation method of claim 10, wherein the toggling of the watchdog clock comprises:
    generating a clock that toggles in response to the reset command; and
    generating the watchdog clock by dividing the clock.

13. The operation method of claim 8, further comprising:
    initializing a control logic that generates control signals that control read, program, and erase operations in response to activation of the reset signal.

* * * * *